June 3, 1958 R. T. BURNETT 2,837,178
BRAKE WITH AXIALLY MOVABLE MEMBERS
Filed July 1, 1953 2 Sheets-Sheet 2

INVENTOR.
RICHARD T. BURNETT
BY Cecil F Arens
ATTORNEY

United States Patent Office

2,837,178
Patented June 3, 1958

2,837,178

BRAKE WITH AXIALLY MOVABLE MEMBERS

Richard T. Burnett, South Bend, Ind., assignor to Bendix Aviation Corporation, South Bend, Ind., a corporation of Delaware Application July 1, 1953, Serial No. 365,377

11 Claims. (Cl. 188—73)

This invention relates to brakes and more particularly to a kinetic energy absorbing device having axially reciprocable friction-producing elements.

Among the principal objects of the invention, with reference to the performance of the brake, are: low pedal travel required on the part of the operator for actuation of the brake, a reduction in operating temperatures to prevent fade in braking effectiveness, constant operating characteristics throughout the wear life of the brake, and minimization of the effect of mechanical and thermal distortion of the drum on braking performance.

Among the principal objects of the invention with reference to the construction of the brakes are: simplification of the design and number of moving parts of the brake, forming brazed connections between parts to be secured together, locating the hydraulic system between portions of the support to protect it from exterior forces and conditions, and fabricating the brake primarily from stamped parts to make possible an economical and reliable construction.

The above and other objects and features of the invention will appear more fully hereinafter from a consideration of the following description, taken in connection with the accompanying drawings, wherein a single embodiment of the invention is illustrated by way of example.

Figure 1:
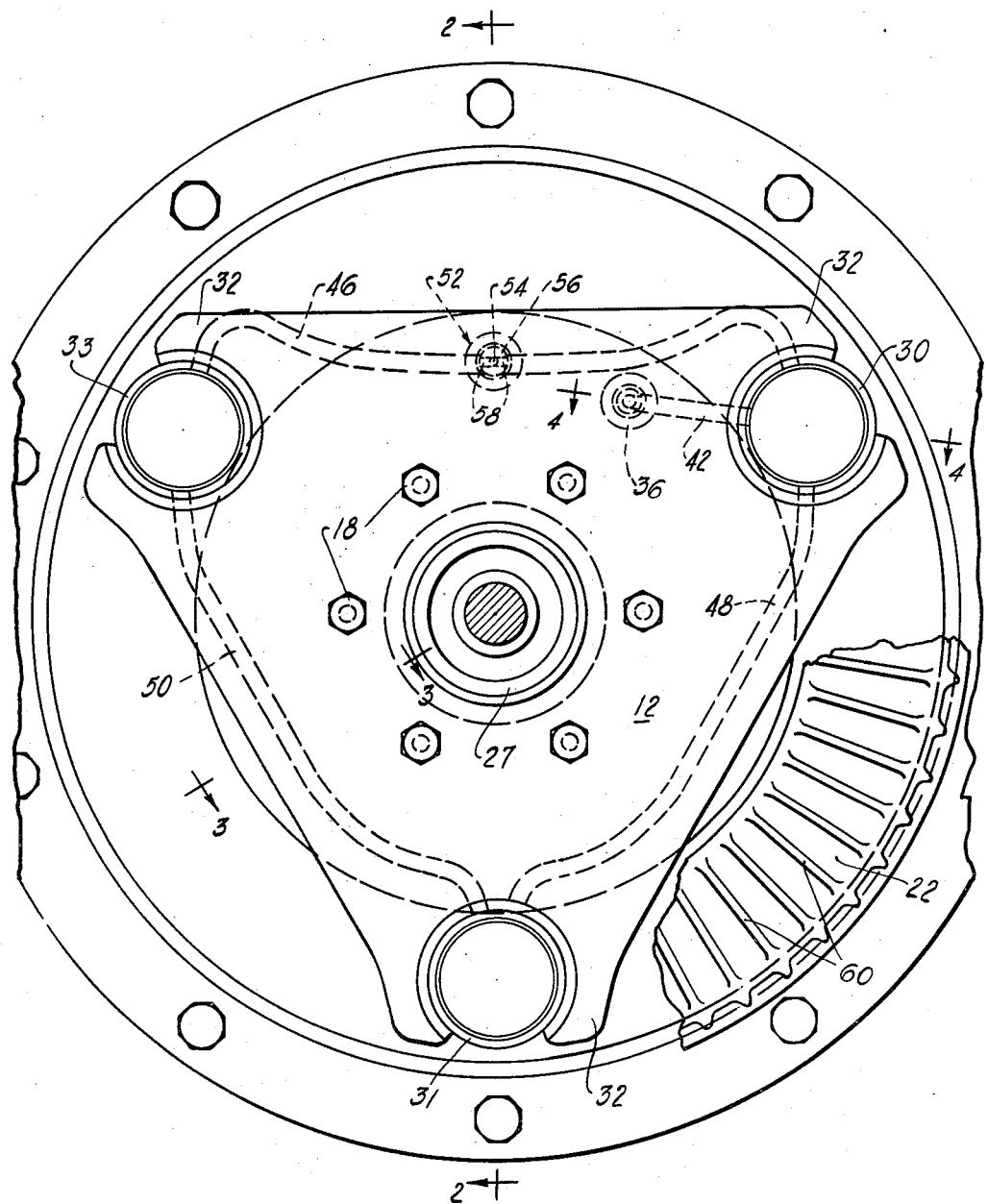
Figure 1 is a side elevation of the assembled brake shown with a portion of the drum removed.
Figures 2, 3, 4:
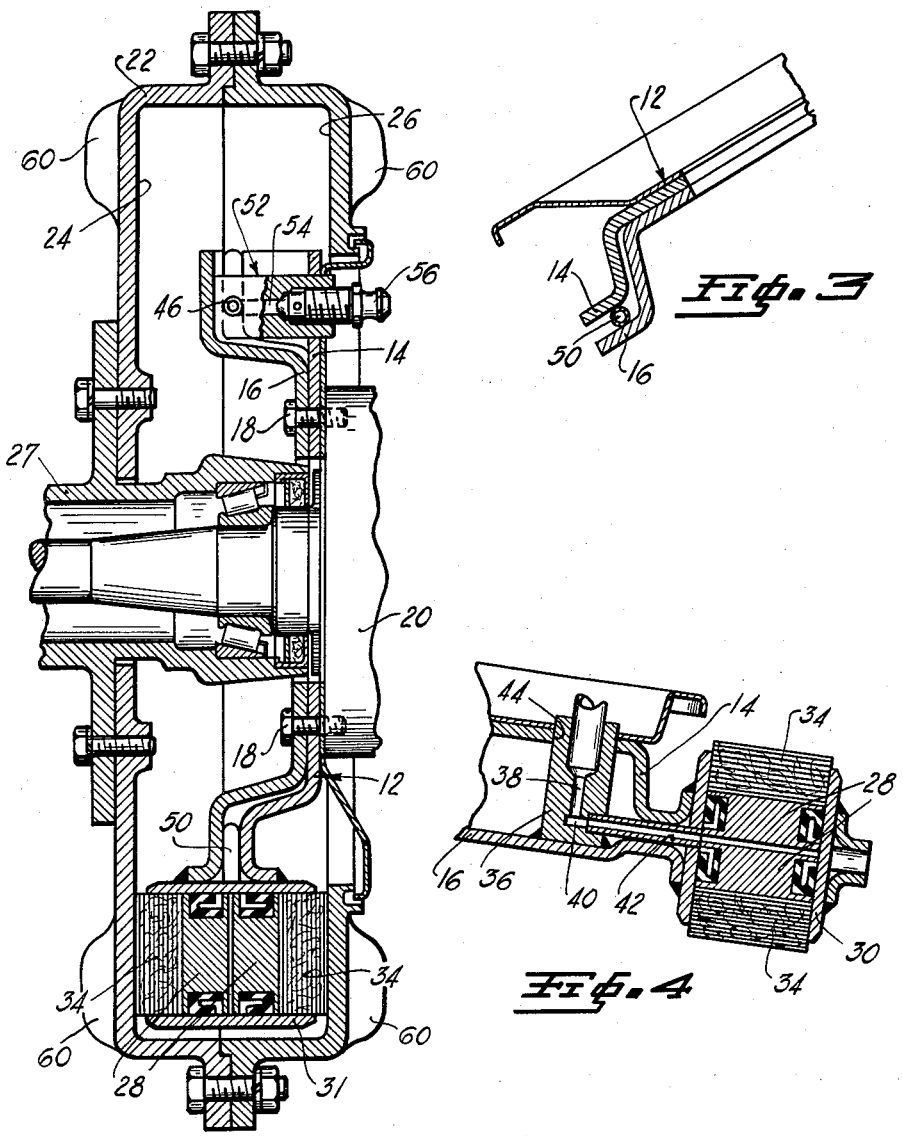
Figure 2 is a sectional view taken on line 2—2 of Figure 1.
Figure 3 is a sectional view of a portion of the support and hydraulic system taken on line 3—3 of Figure 1.
Figure 4 is a sectional view of the cylinder and pistons taken on line 4—4 of Figure 1.

With reference to Figures 1 and 2 a support member 12, consisting of a pair of centrally joined stamped plates 14 and 16, is fixedly secured by a plurality of fastening members 18 to a non-rotatable member, such as axle 20.

A rotatable drum 22 having axially spaced disc surfaces 24 and 26 is rotatably mounted on a wheel hub 27. The axially spaced disc surfaces 24 and 26 are adapted for engagement with a plurality of pairs of oppositely acting pistons 28 reciprocably mounted in cylinders 30, 31 and 33 which are perpendicularly positioned in the support 12 and circumferentially spaced around the drum 22. The two centrally joined plates 14 and 16 form bifurcated projections 32 radially outwardly from the central portion of the support 12 with the cylinders 30, 31 and 33 perpendicularly mounted therein. The projections 32 are axially offset from the central portion of the support 12 in order to position the cylinders 30, 31, and 33 between the two disc surfaces 24 and 26 of the rotatable drum 22.

These radially extending projections 32 substantially encircle the respective cylinders mounted therein, the portions of the projections 32 engaging each cylinder being bent back to form a flange which may be brazed to the outer surface of the cylinder. The plates 14 and 16 forming the projections are axially spaced apart to encircle the cylinders at spaced points along their outer surface; this multiple connection between the support and cylinders tends to give greater stability to their operative position. The spaced-apart connection of the plate stampings 14 and 16 with the cylinders also prevents their twisting out of perpendicular relation with the supporting projections 32.

Reciprocably mounted in cylinders 30, 31, and 33 are a plurality of pairs of oppositely acting pistons 28 having friction material facing 34 arranged between the remote ends thereof and the disc surfaces 24 and 26 of the drum. The pairs of pistons are free-floating, friction-producing elements which are adapted to be spread apart into engagement with disc surfaces 24 and 26 under the influence of hydraulic actuating pressure transmitted to each of the cylinders in a manner next to be described.

A fitting 36 is transversely mounted in a radially outward portion of the support 12 adjacent cylinder 30. The fitting 36 is provided with a longitudinal bore 38 terminating in a radial bore 40 into which projects one end of a conduit 42 the other end of which is connected to the cylinder 30. The fitting 36 extends through an opening 44 formed in the plate 14 and abuts plate 16, having a brazed connection with the latter for securing the fitting in place.

Conduits 46 and 48, intercommunicate cylinder 30 with each of the other cylinders 31 and 33 which are equidistantly spaced along the periphery of the support 12. Conduit 50 intercommunicates the other two cylinders 31 and 33. The points of intersection of the conduits 46, 48 and 50 with the cylinders is an important consideration because this arrangement provides a hydraulic fluid outlet from each of the cylinders at a point where the fluid attains approximately its highest level, thereby permitting efficient purging of air from each of the cylinders during bleeding.

Intersecting conduit 46 is bleed fitting 52 having a centrally located passage 54. The passage 54 terminates in a transverse bore 56 provided with sockets 58 into which extend mid-portions of the conduit 46.

Conduits 42, 46, 48 and 50 are located between the axially-spaced-apart plate stampings 14 and 16, conduits 46, 48, and 50 being positioned in the radially outward portion of the support 12 around the periphery thereof. This location of the conduits has the immediate advantage of protecting them from external forces which could crush or distort them; the possibility of their either being dislodged from interconnection with the cylinders or buckles under any exterior applied strain is thereby minimized. The conduits are also protected from the heat of the drum walls which might otherwise cause boiling of the hydraulic fluid.

The ends of the conduits which are interfitted with the cylinders 30, 31 and 33 have permanent brazed connection therewith and for this reason it is possible by a single brazing operation to simultaneously join the conduits to the cylinders and the cylinders to the projections 32 in assembling the brake.

Between two of the cylinders 30 and 33, the two stampings 14 and 16 are spaced further from each other to accommodate the inlet fitting 36 and bleed fitting 52 and position these members with respect to the brake assembly. It is seen therefore that the stampings 14 and 16 are not entirely flat pieces but are contoured with curved surfaces to provide positioning of the cylinders 30, 31 and 33, fittings 36, 52, and conduits 46, 48, and 50 as well as serving as torque transmitting means.

In operation, fluid pressure generated by the operator from an appropriate master cylinder source (not shown) is introduced through passage 38 in inlet fitting 36 and transmitted to adjacent cylinder 30 via conduit 42. The actuating pressure transmitted to the adjacent cylinder 30 causes the pair of oppositely acting pistons 28 to be axially spread apart thereby applying the friction material facing 34 against disc surfaces 24 and 26 of the rotating drum 22.

Conduits 46 and 48, intercommunicating cylinder 30 with the hydraulic chambers of the other cylinders 31 and 33, transmit the same actuating pressure for effecting simultaneously the same applying operation of the other pairs of pistons reciprocably mounted therein. Conduit 50 intercommunicating the hydraulic chambers of cylinders 31 and 33 insures an equal applying pressure on each of the pairs of pistons. Actuating pressure transmitted to cylinder 30 by inlet fitting 36 will thus be communicated to each of the other cylinders thereby exerting equal applying force on all of the friction-producing pairs of pistons. Hence, the braking effort is distributed evenly among the peripherally spaced braking elements and hydraulic inlet pressure need only be introduced to a single cylinder to accomplish actuation of multiple braking elements.

Braking effectiveness may be increased in the present invention by simply making the aggregate piston area greater. That is, assuming the effectiveness of the brake to be proportional to the applying force exerted on the pairs of pistons, then by simply increasing the areas of the pistons the brake applying force can be made greater with the same applying pressure because the total applying force is equal to the product of the aggregate piston area and the applying pressure. In this way the front wheel brakes may be made more effective than the rear wheel brakes by the expedient of having a greater piston area in the front wheel set. The effectiveness of the brake may thus be made a matter of design preference and may vary from front wheel set to rear wheel set as well as from one type vehicle to another.

The pistons 28 are free-floating within the cylinders, 30, 31 and 33. The friction material facing 34 on the faces of the pistons is maintained in constant light contact with the disc surfaces 24 and 26 of the rotatable drum 22.

The rotatable drum is provided with two friction element engaging surfaces 24 and 26; this wide swept drum area causes cooler operating temperatures thus minimizing "fade" during the braking cycle (loss in brake effectiveness). The lower operating temperatures also prevent deterioration of the lining which contributes to loss of brake effectiveness. The drum may be provided with fins or ribs 60 to increase the radiating surface which results in an even further reduction of operating temperatures.

A second desirable result which stems from the lower operating temperatures is reduction in the pedal travel loss due to thermal expansion of the drum. In conventional brakes the operator must compensate for distortion of the drum due to thermal expansion by varying the displacement of the brake pedal. The present invention proposes to eliminate this undesirable result.

In bleeding the brake, fluid is introduced into the system in the same manner as for braking. Following the course of the fluid it will be seen that it is transmitted to cylinder 30 adjacent inlet fitting 36 which causes fluid to leave cylinder 30 at its upper connection with conduit 46; fluid under pressure is also transmitted by way of conduit 48 to cylinder 31 located at the bottom of the brake assembly where it causes fluid to leave via conduit 50 having connection with cylinder 31 at a point sufficiently elevated to permit complete purging of air therein. Hydraulic fluid leaving cylinder 31 is introduced into cylinder 33 at a point where the hydraulic fluid is at low level and is caused to sweep through the entire cylinder 33, leaving the cylinder 33 at a point where the hydraulic fluid attains a sufficiently elevated level to produce complete purging of air from this part of the system.

Bleeder screw 56 in bleed fitting 52 intersecting conduit 46 is cracked to allow air to leave the system. Bleeding of the hydraulic system in the manner described is accomplished in such a manner as to produce substantially complete purging of air from each of the cylinders and conduits.

Although a particular embodiment of my invention has been described, it will be understood by those skilled in the art that the objects of the invention may be attained by the use of constructions different in certain respects from that disclosed without departing from the underlying principles of the invention.

I claim:

1. For use in combination with a rotatable U-shaped cross section drum having two axially spaced sides, a brake comprising a support member consisting of two plates having substantially flat, juxtaposed center portions, said plates being spaced apart radially outward from the center of the support with portions of the radially outward part of the support axially offset from the center thereof, a plurality of fastening means adapted to secure said support member to a non-rotatable member, a plurality of cylinders perpendicularly mounted in the axially offset portions of said support, a portion of each of said plates encircling said cylinders at opposite ends of the cylinders to secure the cylinders in operative position, a pair of oppositely-acting pistons reciprocably received in each of said cylinders, and a hydraulic system for actuating said pistons, said hydraulic system including an inlet fitting transversely mounted in said support, conduit means interconnecting said fitting and one of said cylinders, conduit means intercommunicating said one cylinder with each of the remaining cylinders whereby hydraulic actuating pressure introduced through said inlet fitting is caused to act on adjacent ends of each of the pairs of pistons reciprocably received in said cylinders, and bleeding means intersecting one of the intercommunicating conduits at a point where the hydraulic fluid attains a sufficiently high level to permit substantially complete purging of air from the hydraulic system, each of said interconnecting conduits being positioned between the spaced-apart portion of said support to prevent damage to the hydraulic system.

2. For use in combination with a rotatable drum having axially spaced disc surfaces, a brake comprising a support member consisting of a pair of stampings having centrally juxtaposed portions and spaced-apart peripheral portions, a plurality of cylinders perpendicularly mounted in the peripheral portions of said support member, so that the spaced apart portions of said stampings encircle the cylinders at opposite ends thereof, a plurality of fastening members adapted to secure said support to a non-rotatable member, a pair of oppositely acting piston members reciprocably received in each of said cylinders, conduit means intercommunicating each of said cylinders whereby actuating pressure introduced into one of said cylinders may be transmitted to each of the other cylinders where the actuating pressure acts on the adjacent ends of the pairs of pistons reciprocably mounted in said cylinders, said conduit means being disposed along the periphery of said support and located between the spaced apart stampings constituting said support, and hydraulic bleed means intersecting one of the conduits intercommunicating said cylinders at a sufficiently elevated level to permit substantially complete purging of air from the hydraulic system.

3. For use in combination with a rotatable member having two axially spaced disc surfaces, a brake comprising a support member having a substantially flat inner portion, birfurcated projections extending radially from the inner portion of said support member, said bifurcated projections being axially offset from the inner portion at selected points along the periphery thereof, a plurality of fastening means securing said support member to a non-rotatable member, a plurality of cylinders perpendicularly mounted in the axially offset portions of said projections with said projections substantially encircling said cylinders at spaced points along the outer surface thereof, a pair of oppositely-acting free-floating pistons reciprocably received in each of said cylinders, conduit means positioned between said bifurcated projections along the periphery of said support, said conduit means providing hydraulic fluid inlet to and exit from each of said cylinders for communicating actuating pressure to each of said pairs of oppositely acting pistons, and a bleed fitting intersecting one of said conduits at a point wherein the hydraulic fluid is sufficiently elevated to permit substantially complete purging of air from the system.

4. In combination with a rotatable U-shaped cross section drum, a brake comprising a support member having a substantially flat inner portion, a plurality of bifurcated projections extending radially outwardly from the center portion of said supporting member, a plurality of cylinders perpendicularly mounted in said bifurcated projections with said projections axially offset from the center portion of said support member to fit the cylinders into the envelope of the rotatable drum, a plurality of pairs of oppositely-acting pistons reciprocably received in said cylinders, a pad of friction material associated with the remote end of each of said pistons, and a hydraulic system for actuating said pairs of pistons and spreading said friction pads into engagement with the drum, said hydraulic system including conduit means interconnecting each of said cylinders whereby the same actuating pressure may be communicated to each of the pairs of pistons reciprocably received therein, said conduit means being positioned between said bifurcated projections and having brazed connection with said cylinders which in turn have brazed connection with said projections thereby permitting a single brazing operation in fabricating the brake assembly.

5. In combination with a rotatable U-shaped cross section drum, a brake comprising a support member, a plurality of bifurcated projections extending radially outwardly from said support, a plurality of circumferentially spaced cylinders perpendicularly mounted in said projections and supported therein by brazed connection with said bifurcations at spaced points along the outer surface of said cylinders, a plurality of pairs of free-floating pistons reciprocably received in said cylinders, a pad of friction material associated with the remote end of each of said pistons, a plurality of fastening means for securing said support member to a non-rotatable member, and a hydraulic system for actuating said pistons and spreading said friction pads into engagement with surfaces of the rotatable drum, said hydraulic system including conduit means intercommunicating each of said cylinders for imparting the same actuating pressure to each of said pairs of pistons reciprocably received therein, said conduit means being positioned between the furcations of said radially extending projections and bleed means intersecting one of said intercommunicating conduits at a point sufficiently elevated to enable substantially complete purging of air from said hydraulic system.

6. In combination with a rotatable member having two axially spaced friction element engaging sides, a brake comprising a support member, a plurality of fastening means for securing said support member to a non-rotatable member, a radially outwardly extending bifurcated portion of said support member, a plurality of cylinders perpendicularly mounted in said radially outward portion which is sufficiently axially offset from the center thereof to position the cylinders between the friction element engaging sides of the rotatable member, a plurality of pairs of free-floating pistons reciprocably received in said cylinders, a pad of friction material associated with the remote end of each of said pistons, and hydraulic actuating means for actuating said pistons and spreading said friction pads into engagement with the rotatable member, said hydraulic actuating means including conduits positioned between the bifurcated portion of said support and interconnecting each of said cylinders for communicating the same hydraulic actuating pressure to each of the pairs of pistons reciprocably received therein, a hydraulic inlet fitting transversely mounted in a radially outward portion of said support, said inlet fitting being mounted adjacent one of said cylinders and interconnected therewith and a hydraulic outlet fitting transversely mounted in a radially outward portion of said support and intersecting one of said conduits at a sufficiently elevated level to permit substantially complete purging of air from the entire hydraulic system.

7. For use in combination with a rotatable U-shaped cross section drum, a brake comprising a support member consisting of a substantially flat inner portion having radially outward axially spaced apart portions offset from the inner portion of the support to extend within the envelope of the U-shaped rotatable drum, a plurality of circumferentially spaced cylinders perpendicularly mounted in the portion of said support extending into the envelope of the rotatable drum, a plurality of pairs of free-floating pistons adapted for frictional engagement with the sides of the rotatable drum, and hydraulic means for actuating said pistons including conduit means intercommunicating each of said cylinders whereby hydraulic pressure transmitted to one of said cylinders may be imparted to each of the pairs of pistons reciprocably mounted in said cylinders, said intercommunicating conduits being positioned between the axially spaced apart portions of said support and retained therein by brazed conection with said cylinders.

8. A brake comprising a support member having axially spaced-apart portions, a plurality of cylinders transversely mounted in said support member, a plurality of pairs of pistons reciprocably received in said cylinders, and adapted for frictional engagement with a rotatable member and hydraulic actuating means for producing frictional engagement of said pistons with a rotatable member, said actuating means including conduits interconnecting said cylinders for transmitting actuating pressure to said pairs of pistons, said conduits being arranged to intersect said cylinders in a manner providing sufficiently elevated outlet ports to permit substantially complete purging of air from each of said cylinders, said conduits being further arranged between axially spaced apart portions of said support to protect them from distortion.

9. A brake comprising a support having radially extending axially spaced apart portions, a plurality of circumferentially arranged cylinders perpendicularly mounted in the radially extending portions of said support, a plurality of pairs of pistons reciprocably received in said cylinders, and hydraulic means for actuating said brake including conduits intercommunicating each of said cylinders, said conduits being positioned between the axially spaced apart portions of said support to protect them from exterior conditions.

10. In a brake, a support member comprising two centrally joined stampings which are laterally spaced-apart at the periphery thereof, a plurality of fluid motors transversely received in the spaced-apart portions of said stampings and secured thereto, a plurality of friction means associated with said fluid motor and actuable thereby, and a circular fluid pressure distributing conduit located wholly between the spaced apart portions of said stampings and extending around the periphery of said stampings to intercommunicate said cylinders.

11. A kinetic-energy-absorbing device comprising a drum having two axially spaced friction surfaces, a torque taking member having radially extended axially spaced apart portions, said drum and torque taking member being relatively rotatable, a plurality of circumferentially arranged cylinders transversely mounted in the radially extended portions of said torque taking member, a plurality of pairs of pistons reciprocably received in said cylinders, and hydraulic means for actuating said pistons including conduits intercommunicating each of said cylinders, said conduits being positioned between the axially spaced portions of said torque taking member to protect them from exterior conditions.

References Cited in the file of this patent

UNITED STATES PATENTS

| | | |
|---|---|---|
| 2,034,732 | Sauzedde | Mar. 24, 1936 |
| 2,251,539 | Ash | Aug. 5, 1941 |
| 2,381,736 | Goepfrich | Aug. 7, 1945 |
| 2,412,335 | House | Dec. 10, 1946 |
| 2,568,858 | Kovac | Sept. 25, 1951 |
| 2,626,684 | Lauer | Jan. 27, 1953 |

FOREIGN PATENTS

| | | |
|---|---|---|
| 818,889 | Germany | Oct. 29, 1951 |

UNITED STATES PATENT OFFICE

CERTIFICATE OF CORRECTION

Patent No. 2,837,178                                June 3, 1958

Richard T. Burnett

It is hereby certified that error appears in the printed specification of the above numbered patent requiring correction and that the said Letters Patent should read as corrected below.

Column 5, line 42, for "bifurcations" read --furcations--; column 6, line 31, for "conection" read --connection--.

Signed and sealed this 14th day of October 1958.

(SEAL)
Attest:
KARL H. AXLINE
Attesting Officer

ROBERT C. WATSON
Commissioner of Patents